United States Patent [19]

Münster

[11] 4,253,345
[45] Mar. 3, 1981

[54] DISTRIBUTOR GEAR ASSEMBLY, PARTICULARLY FOR DOUBLE SCREW PRESSES

[75] Inventor: Heinrich Münster, Feucht, Fed. Rep. of Germany

[73] Assignee: Leistritz Maschinenfabrik, Paul Leistritz GmbH, Nuremberg, Fed. Rep. of Germany

[21] Appl. No.: 2,142

[22] Filed: Jan. 9, 1979

[30] Foreign Application Priority Data

Jan. 12, 1978 [DE] Fed. Rep. of Germany ....... 2801138

[51] Int. Cl.³ ............................................. F16H 37/06
[52] U.S. Cl. .............................. 74/665 GA; 74/665 G
[58] Field of Search ......... 74/665 G, 665 GA, 750 R, 74/801

[56] References Cited

U.S. PATENT DOCUMENTS

| | | | |
|---|---|---|---|
| 2,892,362 | 6/1959 | Nicholas | 74/665 GA |
| 2,905,011 | 9/1959 | Armstrong et al. | 74/665 GA X |
| 2,965,214 | 12/1960 | Schlumpf et al. | 74/750 R X |
| 2,972,786 | 2/1961 | Tabor | 74/801 X |
| 3,064,497 | 11/1962 | Zagar | 74/665 GA |
| 4,044,633 | 8/1977 | Lee | 74/750 R |
| 4,144,775 | 3/1979 | Schafer | 74/665 GA |

FOREIGN PATENT DOCUMENTS

| | | | |
|---|---|---|---|
| 140617 | 12/1949 | Australia | 74/665 G |
| 631113 | 6/1936 | Fed. Rep. of Germany | 74/750 R |
| 7316993 | 5/1973 | Fed. Rep. of Germany | . |
| 2619019 | 11/1977 | Fed. Rep. of Germany | . |
| 529641 | 6/1955 | Italy | 74/665 GA |

*Primary Examiner*—Leslie Braun
*Attorney, Agent, or Firm*—Jordan and Hamburg

[57] ABSTRACT

A distributor gear assembly includes a housing having a driving shaft and first and second distributing shafts rotatably mounted therein such that the axes of the three shafts are disposed in a common plane. An annular internal gear wheel is rotatably mounted in the housing with the three shafts passing through the annular internal gear wheel. Each of the three shafts has a gear mounted thereon with the gear on the first distributing shaft being axially offset relative to the gear on the second distributing shaft, the gear on the driving shaft meshing with the annular internal gear wheel and with the gear on the first distributing shaft and the gear on the second distributing shaft also meshing with the annular internal gear wheel.

6 Claims, 2 Drawing Figures

DISTRIBUTOR GEAR ASSEMBLY, PARTICULARLY FOR DOUBLE SCREW PRESSES

BACKGROUND OF THE INVENTION

This invention relates to a distributor gear assembly, particularly for double screw presses where the driving shaft distributes the torque directly to a distributing shaft and over an idler gear to another counter-rotating distributing shaft.

A large number of distributor gear assemblies of this type are known. For example, a distributor gear of the aforedescribed type is known where the gear on a second distributing shaft meshes with the first distributing shaft, in other words, where the latter represents the idler gear which serves as a connector to the gear of the driving shaft. This well known arrangement has, at first, the disadvantage that alternating bending stresses occur in the gears, resulting in a disadvantageous summation of the gear loads in relation to the bearing loads. These resulting loads must be handled by costly bearing arrangements or the result will be short durability even at low loads.

Several distributor gear assemblies for double screw presses use annular gears for the distribution of torque but usually provide for each distributing shaft a separate annular gear for the distribution of the power or torque, respectively through the annular gears (in this respect see for example DT-Gbm 7 316 993). Systems of this kind result in very expensive gear trains.

Furthermore, DT-OS 2 619 019 discloses an arrangement where the driving shaft is formed in such a way that it acts as one of the distributing shafts and its gear meshes partly with an idler gear and an annular gear with the gear of the second distributing shaft. This construction requires the use of a very large idler gear. Furthermore, the necessarily large size of the shaft which transfers the whole torque, and also the group of bearings for the second distributing shaft leads to an enlarged distance between the axes of both shafts.

SUMMARY OF THE INVENTION

Accordingly, an object of the present invention is to overcome the above disadvantages of these known prior art arrangements and to provide a distributor gear assembly for transmitting a high torque at a low cost utilizing radial bearings of long life expectancy, excluding as much as possible any intermediate bearings, and allowing small distances between the axes of the distributing shafts.

In order to achieve this objective, the present invention provides, in a distributor gear assembly of the above mentioned kind, an idler gear which is an annular gear wheel, traversed by the shafts, and with the axis of the annular gear wheel disposed in the plane of the axes. The gears of both distributing shafts mesh with either the inner teeth of the annular gear wheel or the gear of the driving shaft, respectively, and are disposed axially offset relative to each other. The gears of the driving shaft and of the distributing shafts and the annular gear wheel have the same gear module or profile.

The construction according to the invention distributes within the annular gear wheel the torque introduced by the driving shaft, on the one hand, to the first distributing shaft and, on the other hand, to the second distributing shaft by means of the idler gear formed as an annular gear wheel. This results in compensation of the tooth forces upon the gear of the driving shaft, either preponderantly or fully according to the sizes of the chosen gears so that only small bearing loads occur at the driving shaft or none at all.

The load upon the gear teeth of the driving shaft lies in both meshes on the same side of the tooth flanks so that the root of the teeth is not stressed by the disadvantageous alternating force but by a dynamic force. A force momentum of the driving shaft between the bearings, capable of deforming the flanks of the teeth and the area of the bearings is either very small or nonexistant due to the compensation of the tooth powers.

The axial offsetting of the gears of both distributing shafts allows at fixed distance of the axes the largest possible diameter of the gear, thus at hight torque loads and bearing loads are as low as possible, so that even at short distances between the axes of the distributing shafts long working lives may be obtained from low priced standard bearings and breakage of the gear teeth is prevented.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of the equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
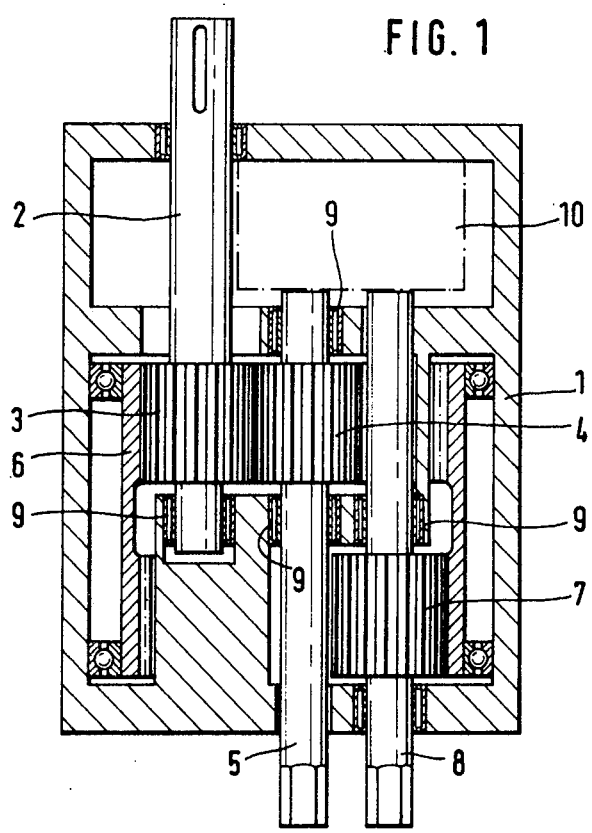
FIG. 1 is a sectional view through a distributor gear according to one embodiment of the invention.
Figure 2:
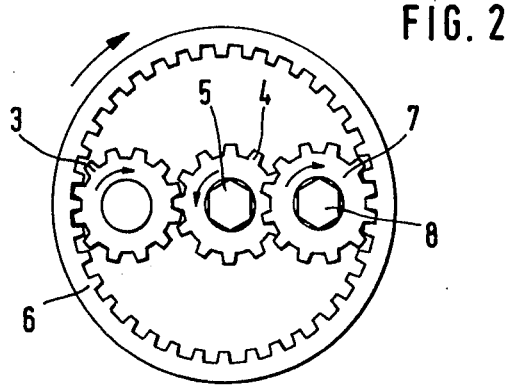
FIG. 2 is a front view of the gear with the housing omitted.

Referring to the drawings, there is shown a housing 1 in which a driving shaft 2 is rotatably mounted. A gear 3 mounted on the shaft 2 meshes on the one hand with a gear 4 on a distributing shaft 5 and on the other hand, with the internal teeth of an annular gear wheel 6. The annular gear wheel 6 also meshes with a gear 7 on a second distributing shaft 8 of the gear train. The gear 7 is offset axially relative to the gear 4. Radial bearings are disposed at 9 in order to support the radial loads on the shafts and axial bearings are disposed at 10 in order to support the axial forces on the distributing shafts 5 and 8.

It is thought that the invention and many of its attendant advantages will be understood from the foregoing description and that it will be apparent that various changes may be made in the form, construction, and arrangements of the parts without departing from the spirit and scope of the invention or sacrificing all of its material advantages. The form heretofore described being merely a preferred embodiment thereof.

What is claimed is:

1. A distributor gear assembly comprising a housing, a driving shaft and first and second distributing shafts rotatably mounted in said housing such that the axes of said three shafts are disposed in a common plane, an annular internal gear wheel rotatably mounted in said housing, said three shafts passing through said annular internal gear wheel, each of said three shafts having a gear mounted thereon, said gear on said first distributing shaft being axially offset relative to the gear on the second distributing shaft, said gear on said driving shaft meshing with the annular internal gear wheel and with the gear on said first distributing shaft, said gear on said second distributing shaft also meshing with the annular internal gear wheel.

2. A distributor gear assembly according to claim 1 wherein the axis of said first distributing shaft is coinciding with the axis of said annular internal gear wheel.

3. A distributor gear assembly according to claim 1 where the gears on said driving shaft and on said first and second distributing shafts all have the same number of teeth.

4. A distributor gear assembly according to claim 3 wherein the gears on said driving shaft and on said first and second distributing shaft all have the same diameter.

5. A distributor gear assembly according to claim 3 wherein the gears on said driving shaft and on said first and second distributing shaft all have the same gear profile.

6. A distributor gear assembly according to claim 1 further comprising bearings in said housing for rotatably supporting said three shafts, at least one bearing for each of said first and second distributing shafts being disposed axially between said gear on said first distributing shaft and said gear on said second distributing shaft.

* * * * *